(12) United States Patent
Yoeli (10) Patent No.: US 7,918,416 B2
(45) Date of Patent: *Apr. 5, 2011

(54) DUCTED FAN VEHICLES PARTICULARLY USEFUL AS VTOL AIRCRAFT

(75) Inventor: Rafi Yoeli, Tel-Aviv (IL)

(73) Assignee: Urban Aeronautics, Ltd., Yavne (IL)

( * ) Notice: Subject to any disclaimer, the term of this patent is extended or adjusted under 35 U.S.C. 154(b) by 754 days.

This patent is subject to a terminal disclaimer.

(21) Appl. No.: 11/892,414

(22) Filed: Aug. 22, 2007

(65) Prior Publication Data

US 2009/0140102 A1    Jun. 4, 2009

Related U.S. Application Data (63) Continuation of application No. 10/987,321, filed on Nov. 15, 2004, now Pat. No. 7,275,712, which is a continuation of application No. 10/479,149, filed as application No. PCT/IL02/00417 on May 28, 2002, now Pat. No. 6,817,570.

(51) Int. Cl.
*B64C 27/20* (2006.01)
*B64C 29/00* (2006.01)
(52) U.S. Cl. .................. 244/23 A; 244/23 C; 244/23 D
(58) Field of Classification Search .................. 244/12.1, 244/12.2, 12.3, 12.4, 12.5, 12.6, 23 R, 23 A, 244/23 B, 23 C, 23 D, 53 B; 180/116, 117
See application file for complete search history.

(56) References Cited

U.S. PATENT DOCUMENTS

| | | | |
|---|---|---|---|
| 1,287,076 A | 12/1918 | Moses | |
| 2,077,471 A | 4/1937 | Fink | |
| 2,138,999 A | 12/1938 | Clark | |
| 2,242,201 A | 5/1941 | Woods | |
| 2,273,724 A | 2/1942 | Nelson et al. | |
| D155,004 S | 8/1949 | Gluhareff | |
| 2,709,947 A | 6/1955 | Woods | |

(Continued)

FOREIGN PATENT DOCUMENTS

EP    0 236583    9/1987

(Continued)

OTHER PUBLICATIONS

Corrected Written Opinion and Search Report of the International Searching Authority in International Application No. PCT/IL07/01475 (now WO 2008/065664 A2) (Yoeli) dated Jul. 27, 2009.

(Continued)

*Primary Examiner* — Rob Swiatek
(74) *Attorney, Agent, or Firm* — Nixon & Vanderhye, P.C.

(57) ABSTRACT

A vehicle, including a vehicle frame, a duct carried by the vehicle frame with the longitudinal axis of the duct perpendicular to the longitudinal axis of the vehicle frame, a propeller rotatably mounted within the duct about the longitudinal axis of the duct to force an ambient fluid therethrough from its inlet at the upper end of the duct through its exit at the lower end of the duct, and thereby to produce an upward lift force applied to the vehicle, and a plurality of parallel, spaced vanes pivotally mounted to and across the inlet end of the duct about pivotal axes perpendicular to the longitudinal axis of the duct and substantially parallel to the longitudinal axis of the vehicle frame, the vanes being selectively pivotal about their axes to produce a desired horizontal force component to the lift force applied to the vehicle.

10 Claims, 4 Drawing Sheets

U.S. PATENT DOCUMENTS

| | | |
|---|---|---|
| 2,734,705 A | 2/1956 | Robertson |
| 2,777,649 A | 1/1957 | Williams |
| 2,812,636 A | 11/1957 | Kadosch et al. |
| 2,899,149 A | 8/1959 | Breguet |
| 2,930,544 A | 3/1960 | Howell |
| 2,936,969 A | 5/1960 | Griffith et al. |
| 2,939,649 A | 6/1960 | Shaw |
| 2,951,661 A | 9/1960 | Dorman et al. |
| 2,955,780 A | 10/1960 | Hulbert |
| 2,968,453 A | 1/1961 | Bright |
| 2,973,921 A | 3/1961 | Price |
| 2,975,676 A | 3/1961 | Butler |
| 2,988,301 A | 6/1961 | Fletcher |
| 3,033,493 A | 5/1962 | Wilde et al. |
| 3,039,537 A | 6/1962 | Heidelberg |
| 3,082,977 A | 3/1963 | Arlin |
| 3,088,695 A | 5/1963 | Clark |
| 3,090,581 A | 5/1963 | Einarsson |
| 3,116,898 A | 1/1964 | Clark et al. |
| 3,136,500 A | 6/1964 | Kerry |
| 3,139,244 A | 6/1964 | Bright |
| 3,161,374 A | 12/1964 | Allred et al. |
| 3,167,273 A | 1/1965 | Calderon |
| 3,174,573 A | 3/1965 | Chaplin |
| 3,179,353 A | 4/1965 | Peterson |
| 3,179,354 A | 4/1965 | Alvarez-Calderon |
| 3,181,810 A | 5/1965 | Olson |
| 3,184,183 A | 5/1965 | Piasecki |
| 3,187,817 A | 6/1965 | Colley |
| 3,198,082 A | 8/1965 | Kerris |
| 3,201,067 A | 8/1965 | Meyerhoff |
| 3,203,645 A | 8/1965 | Shaw |
| 3,223,354 A | 12/1965 | Seibold et al. |
| 3,224,712 A | 12/1965 | Taylor et al. |
| 3,231,221 A | 1/1966 | Platt |
| 3,244,246 A | 4/1966 | Weiland |
| 3,262,511 A | 7/1966 | Carr |
| 3,262,657 A | 7/1966 | Anker-Holth |
| 3,265,329 A | 8/1966 | Postelson-Apostolescu |
| 3,276,528 A | 10/1966 | Tucknott et al. |
| 3,289,977 A | 12/1966 | Staats |
| 3,383,074 A | 5/1968 | Coplin |
| 3,384,327 A | 5/1968 | Postelson-Apostolesc |
| 3,397,852 A | 8/1968 | Katzen |
| 3,397,854 A | 8/1968 | Reyle |
| 3,454,238 A | 7/1969 | Goodson |
| 3,463,420 A | 8/1969 | Butler et al. |
| 3,481,559 A | 12/1969 | Apostolescu |
| 3,519,224 A | 7/1970 | Boyd et al. |
| 3,559,921 A | 2/1971 | Timperman |
| 3,580,530 A | 5/1971 | Wada |
| 3,584,810 A | 6/1971 | Velton |
| 3,606,208 A | 9/1971 | Postelson-Apostolescu |
| 3,614,030 A | 10/1971 | Moller |
| 3,627,235 A | 12/1971 | Lippisch |
| 3,665,809 A | 5/1972 | Darlington et al. |
| 3,713,748 A | 1/1973 | Langley |
| 3,752,417 A | 8/1973 | Lagace |
| 3,827,527 A | 8/1974 | Bertelsen |
| 3,873,049 A | 3/1975 | Horsdal |
| 3,904,155 A | 9/1975 | Chavis |
| 3,912,201 A | 10/1975 | Bradbury |
| 3,955,780 A | 5/1976 | Postelson |
| 3,972,490 A | 8/1976 | Zimmermann et al. |
| 4,022,405 A | 5/1977 | Peterson |
| 4,043,421 A | 8/1977 | Smith |
| 4,149,688 A | 4/1979 | Miller, Jr. |
| 4,194,707 A | 3/1980 | Sharpe |
| 4,469,294 A | 9/1984 | Clifton |
| 4,505,442 A | 3/1985 | Kirsch et al. |
| 4,505,443 A | 3/1985 | Bradfield et al. |
| 4,537,372 A | 8/1985 | Forizs |
| 4,598,890 A | 7/1986 | Herzog et al. |
| 4,701,602 A | 10/1987 | Schaefer et al. |
| 4,754,940 A | 7/1988 | Deter |
| 4,757,962 A | 7/1988 | Grant |
| 4,765,568 A | 8/1988 | Carl et al. |
| 4,795,111 A | 1/1989 | Moller |
| 4,796,836 A | 1/1989 | Buchelt |
| 4,824,048 A | 4/1989 | Kim |
| 4,828,203 A | 5/1989 | Clifton et al. |
| 4,834,319 A | 5/1989 | Ewy et al. |
| 4,856,732 A | 8/1989 | Eickmann |
| 4,880,071 A | 11/1989 | Tracy |
| 4,892,274 A | 1/1990 | Pohl et al. |
| 4,917,332 A | 4/1990 | Patterson, Jr. |
| 4,934,629 A | 6/1990 | Brant |
| 5,064,143 A | 11/1991 | Bucher |
| 5,101,927 A | 4/1992 | Murtuza |
| 5,209,428 A | 5/1993 | Bevilaqua et al. |
| 5,297,761 A | 3/1994 | Kendall, Jr. et al. |
| 5,419,514 A | 5/1995 | Ducan |
| 5,454,531 A | 10/1995 | Melkuti |
| 5,505,407 A | 4/1996 | Chiappetta |
| 5,666,483 A | 9/1997 | McClary |
| 5,738,302 A | 4/1998 | Freeland |
| 5,746,390 A | 5/1998 | Chiappetta et al. |
| 5,806,805 A | 9/1998 | Elbert et al. |
| 5,890,441 A | 4/1999 | Swinson et al. |
| 6,089,501 A | 7/2000 | Frost |
| 6,105,901 A | 8/2000 | Ulanoski et al. |
| 6,119,985 A | 9/2000 | Clapp et al. |
| 6,170,778 B1 | 1/2001 | Cycon et al. |
| 6,254,032 B1 | 7/2001 | Bucher |
| 6,270,038 B1 | 8/2001 | Cycon et al. |
| 6,318,668 B1 | 11/2001 | Ulanoski et al. |
| 6,371,406 B1 | 4/2002 | Corcoran |
| 6,382,559 B1 | 5/2002 | Sutterfield et al. |
| 6,431,494 B1 | 8/2002 | Kinkead et al. |
| 6,446,911 B1 | 9/2002 | Yount et al. |
| 6,457,670 B1 | 10/2002 | Geranio |
| 6,464,166 B1 | 10/2002 | Yoeli |
| 6,474,598 B2 | 11/2002 | Carter, Jr. |
| 6,520,449 B2 | 2/2003 | Illingworth |
| 6,561,456 B1 | 5/2003 | Devine |
| 6,568,630 B2 | 5/2003 | Yoeli |
| 6,616,094 B2 | 9/2003 | Illingworth |
| 6,644,598 B2 | 11/2003 | Glezer et al. |
| 6,704,624 B2 | 3/2004 | Ortega et al. |
| 6,708,920 B2 | 3/2004 | Fukuyama |
| 6,745,977 B1 | 6/2004 | Long et al. |
| 6,751,530 B2 | 6/2004 | Seifert et al. |
| D496,606 S | 9/2004 | Sanders, Jr. |
| 6,808,140 B2 | 10/2004 | Moller |
| 6,817,570 B2 | 11/2004 | Yoeli |
| 6,824,095 B2 | 11/2004 | Mao |
| 6,834,832 B2 | 12/2004 | Jamgarov |
| 6,843,447 B2 | 1/2005 | Morgan |
| 6,883,748 B2 | 4/2005 | Yoeli |
| 6,886,776 B2 | 5/2005 | Wagner et al. |
| 6,892,979 B2 | 5/2005 | Milde |
| 6,892,980 B2 | 5/2005 | Kawai |
| 6,913,226 B2 | 7/2005 | Huynh |
| 6,926,322 B2 | 8/2005 | Browne et al. |
| 6,974,105 B2 | 12/2005 | Pham |
| 7,246,769 B2 * | 7/2007 | Yoeli ............................ 244/23 B |
| 7,249,732 B2 | 7/2007 | Sanders, Jr. et al. |
| 7,267,300 B2 | 9/2007 | Heath et al. |
| 7,275,712 B2 * | 10/2007 | Yoeli ............................ 244/23 A |
| 7,717,368 B2 | 5/2010 | Yoeli |
| 7,789,342 B2 | 9/2010 | Yoeli |
| 7,806,362 B2 | 10/2010 | Yoeli |
| 2002/0161488 A1 | 10/2002 | Guillemin et al. |
| 2003/0038213 A1 | 2/2003 | Yoeli |
| 2003/0062442 A1 | 4/2003 | Milde, Jr. |
| 2003/0062443 A1 | 4/2003 | Wagner et al. |
| 2003/0085319 A1 | 5/2003 | Wagner et al. |
| 2003/0127559 A1 | 7/2003 | Walmsley |
| 2003/0195673 A1 | 10/2003 | Foch et al. |
| 2004/0026563 A1 | 2/2004 | Moller |
| 2004/0104303 A1 | 6/2004 | Mao |
| 2004/0149857 A1 | 8/2004 | Yoeli |
| 2004/0155143 A1 | 8/2004 | Yoeli |
| 2005/0029407 A1 | 2/2005 | Pohl et al. |
| 2005/0040283 A1 | 2/2005 | Frazer |
| 2005/0065669 A1 | 3/2005 | Roux et al. |
| 2005/0178881 A1 | 8/2005 | Yoeli |

| | | | |
|---|---|---|---|
| 2005/0242231 | A1 | 11/2005 | Yoeli |
| 2006/0113426 | A1 | 6/2006 | Yoeli |
| 2006/0231675 | A1 | 10/2006 | Bostan |
| 2007/0034734 | A1 | 2/2007 | Yoeli |
| 2007/0034739 | A1 | 2/2007 | Yoeli |
| 2007/0095971 | A1 | 5/2007 | Yoeli |
| 2007/0158494 | A1 | 7/2007 | Burrage |
| 2008/0054121 | A1 | 3/2008 | Yoeli |
| 2008/0142643 | A1 | 6/2008 | Yoeli |
| 2008/0283673 | A1 | 11/2008 | Yoeli |
| 2009/0084907 | A1 | 4/2009 | Yoeli |
| 2009/0159757 | A1 | 6/2009 | Yoeli |
| 2010/0051740 | A1 | 3/2010 | Yoeli |
| 2010/0051753 | A1 | 3/2010 | Yoeli |
| 2010/0076625 | A1 | 3/2010 | Yoeli |
| 2010/0270419 | A1 | 10/2010 | Yoeli |

FOREIGN PATENT DOCUMENTS

| | | |
|---|---|---|
| EP | 0 922925 | 6/1999 |
| GB | 935884 A | 9/1963 |
| GB | 951186 A | 3/1964 |
| IL | 666076 A | 8/1964 |
| IT | 666076 | 8/1964 |
| IT | 666076 A | 8/1964 |
| SE | 184314 | 6/1963 |
| WO | WO 01/93039 A1 | 12/2001 |
| WO | 02/098732 | 12/2002 |
| WO | WO 02/096750 A2 | 12/2002 |
| WO | WO 03/016134 A1 | 2/2003 |
| WO | WO 2004/012993 A1 | 2/2004 |
| WO | WO 2004/031876 A1 | 4/2004 |
| WO | WO 2005/039972 A2 | 5/2005 |
| WO | WO 2006/072960 A2 | 7/2006 |
| WO | WO 2006/131920 | 12/2006 |
| WO | WO 2007/052271 A2 | 5/2007 |
| WO | WO 2007/099543 A2 | 9/2007 |
| WO | WO 2007/129313 A2 | 11/2007 |
| WO | WO 2008/065654 A2 | 6/2008 |
| WO | WO 2008/065664 A2 | 6/2008 |
| WO | 2008/135973 | 11/2008 |
| WO | 2009/077968 | 6/2009 |
| WO | 2009/147630 A1 | 12/2009 |
| WO | 2010/026517 A2 | 3/2010 |
| WO | 2010/067325 A2 | 6/2010 |

OTHER PUBLICATIONS

U.S. Appl. No. 12/549,872 (Yoeli), filed Aug. 28, 2009.
U.S. Appl. No. 12/598,514 (Yoeli), filed Nov. 2, 2009.
U.S. Appl. No. 12/224,549 (Yoeli), filed Nov. 4, 2008.
U.S. Appl. No. 12/226,952 (Yoeli), filed Feb. 27, 2009.
Written Opinion and Search Report of the International Searching Authority in International Application No. PCT/IL07/00271 (now WO 2007/099543 A2) (Yoeli) dated Oct. 28, 2008.
Written Opinion and Search Report of the International Searching Authority in International Application No. PCT/IL07/01475 (now WO 2008/065664 A2) (Yoeli) dated Sep. 2, 2008.
U.S. Appl. No. 12/516,257 (Yoeli), filed May 26, 2009.
U.S. Appl. No. 12/516,743 (Yoeli), filed May 28, 2009.
Written Opinion and Search Report of International Searching Authority in International Application No. PCT/IL07/00271 (now WO 2007/099543 A2) (Yoeli) dated Oct. 28, 2008.
Written Opinion and Search Report of International Searching Authority in International Application No. PCT/IL07/01475(now WO 2008/065664 A2) (Yoeli) dated Sep. 2, 2008.
Edward D. Flinn, "Revolutionary X-Hawk Hovers Near Success," Aerospace America, Jul. 2003, pp. 26-28.
Raymond L. Robb, "Driving on Air: 20$^{th}$ Century Flying Carpets," VERTIFLITE, vol. 51, No. 1, Spring 2005, pp. 2-11.
Urban Aeronautics Ltd., "The X-Hawk VTOL Utility Vehicle"—product description and specifications, 2004.
Piasecki Aircraft Corporation Product Description and History for Piasecki VZ-8 VTOL research vehicle (undated).
Written Opinion in International Application No. PCT/IL02/00417 (now WO 02/096750 (Yoeli)), Aug. 19, 2003.
International Preliminary Examination Report for International Application No. PCT/IL02/00417 (now WO 02/096750 (Yoeli)), Oct. 20, 2003.
Corrected International Preliminary Examination Report for International Application No. PCT/IL02/00417 (now WO 02/096750 (Yoeli)), Jul. 25, 2004.
International Search Report for International Application No. PCT/IL02/000439 (now WO 2002/098732 (Yoeli)), dated Apr. 28, 2003, published Mar. 18, 2004.
International Preliminary Examination Report in International Application No. PCT/IL02/000439 (now WO 2002/098732 (Yoeli)), Jul. 26, 2004.
International Search Report for International Application No. PCT/IL02/00682 (now WO 03/016134 (Yoeli)), dated Dec. 6, 2002.
International Search Report for International Application No. PCT/IL03/00640 (now WO 2004/012993 (Yoeli)), dated Jan. 2, 2004.
International Search Report for International Application No. PCT/IL03/00786 (now WO 2004/031876 (Yoeli)), Feb. 9, 2004.
International Search Report for International Application No. PCT/IL04/00984 (now WO 2005/039972 (Yoeli)), dated Dec. 6, 2005, published Jan. 26, 2006.
Written Opinion of the International Searching Authority in International Application No. PCT/IL04/00984 (now WO 2005/039972 (Yoeli)), dated Dec. 6, 2005.
Copending U.S. Appl. No. 10/523,609 (Yoeli), filed at the U.S. Patent Office Feb. 7, 2005 (International Application date Aug. 5, 2003).
Copending U.S. Appl. No. 11/061,652 (Yoeli), filed at the U.S. Patent Office Feb. 22, 2005.
Copending U.S. Appl. No. 11/411,243 (Yoeli), filed at the U.S. Patent Office Apr. 26, 2006 (International Application date Oct. 27, 2004).
Copending U.S. Appl. No. 11/447,311 (Yoeli), filed at the U.S. Patent Office Jun. 6, 2006.
Copending U.S. Appl. No. 11/405,003 (Yoeli), filed at the U.S. Patent Office Apr. 17, 2006.
De Lorean DMC-12, alleged to have first been produced in 1981 (images available from Wikipedia, the free encyclopedia, at http://en.wikipedia.org/wiki/De_Lorean_DMC-12 ).
International Search Report for International Application No. PCT/IL06/01264 (now WO 2007/052271 A2) (Yoeli) dated Aug. 5, 2008.
Written Opinion of the International Searching Authority in International Application No. PCT/IL06/01264 (now WO 2007/052271 A2) (Yoeli) dated Aug. 5, 2008.
International Search Report for International Application No. PCT/IL07/00544 (now WO 2007/129313) (Yoeli) dated Jul. 7, 2008.
Written Opinion of the International Searching Authority in International Application No. PCT/IL07/00544 (now WO 2007/129313) (Yoeli) dated Jul. 7, 2008.
Co-Pending U.S. Appl. No. 11/794,906 (Yoeli), filed at the U.S. Patent Office Jul. 9, 2007.
Co-Pending U.S. Appl. No. 11/798,187 (Yoeli), filed at the U.S. Patent Office May 10, 2007.
Co-Pending U.S. Appl. No. 11/826,202 (Yoeli), filed at the U.S. Patent Office Jul. 12, 2007.
Written Opinion of the International Searching Authority in International application No. PCT/IL006/00032 (Yoeli), dated Sep. 11, 2006.
International Preliminary Report on Patentability in International Application No. PCT/IL06/00032 (Yoeli), dated Sep. 11, 2006.
U.S. Appl. No. 10/987,321 (Yoeli), filed Nov. 15, 2004.
International Search Report for International Application No. PCT/IL06/00663 (now WO 2006/131920) (Yoeli) dated Dec. 19, 2006.
Written Opinion of the International Searching Authority in International Application No. PCT/IL06/00663 dated Dec. 19, 2006.
English Abstract of Italian Patent No. 666076, dated Aug. 1964.
International Search Report for International Application No. PCT/IL0701465 (now WO 2008/065654) (Yoeli) dated Sep. 30, 2008.
Written Opinion of the International Searching Authority in International Application No. PCT/IL0701465 now WO 2008/065654) (Yoeli) dated Sep. 30, 2008.
International Search Report for International Application No. PCT/IL08/00575 (now WO 2008/135973) (Yoeii) dated Oct. 28, 2008.
Written Opinion of the International Searching Authority in International Application No. PCT/IL08/00575 (now WO 2008/135973) (Yoeli) dated Oct. 28, 2008.

Written Opinion and International Search Report of the International Searching Authority in International Application No. PCT/IB09/053768 (Yoeli) (now WO 2010-026517 A2) dated Mar. 3, 2010.

Written Opinion and International Search Report of the International Searching Authority in International Application No. PCT/IB08/055301 (now WO 2009/077968) (Yoeli) dated Aug. 14, 2009.

Written Opinion and International Search Report of the International Searching Authority in International Application No. PCT/IB09/052346 (Yoeli) dated Oct. 20, 2009.

International Search Report for International Application No. PCT/IL02/00417 (now WO 02/096750 (Yoeli)), dated May 23, 2003, published Oct. 2, 2003.

International Preliminary Report on Patentability in International Application No. PCT/IL04/00984 (now WO 2005/039972 (Yoeli)), dated May 1, 2006.

U.S. Appl. No. 12/747,830 (Yoeli), filed Jun. 11, 2010.

Written Opinion and International Search Report of the International Searching Authority in International Application No. PCT/IB09/55656 (now WO 2010-067325 A2) mailed Sep. 30, 2010.

U.S. Appl. No. 12/938,444 (Yoeli) filed Nov. 3, 2010.

U.S. Appl. No. 12/989,533 (Yoeli) filed Oct. 25, 2010.

\* cited by examiner

DUCTED FAN VEHICLES PARTICULARLY USEFUL AS VTOL AIRCRAFT

This application is a Continuation of U.S. patent application Ser. No. 10/987,321 filed Nov. 15, 2004, now U.S. Pat. No. 7,275,712 which is a Continuation of U.S. patent application Ser. No. 10/479,149, filed Nov. 28, 2003, now U.S. Pat No. 6,817,570, which is a U.S. National Phase Application under 35 U.S.C. 371 of PCT International Application No. PCT/IL02/00417, which has an international filing date of May 28, 2002, and which claims priority from U.S. patent application Ser. No. 09/865,678, filed May 29, 2001.

FIELD AND BACKGROUND OF THE INVENTION

The present invention relates to ducted fan vehicles, and particularly to such vehicles useful as VTOL (Vertical Take-Off and Landing) aircraft.

Many different types of VTOL aircraft have been proposed where the weight of the vehicle in hover is carried directly by rotors or propellers, with the axis of rotation perpendicular to the ground. One well known vehicle of this type is the conventional helicopter which includes a large rotor mounted above the vehicle fuselage. Other types of vehicles rely on propellers that are installed inside circular cavities, shrouds, ducts or other types of nacelle, where the propeller or rotor is not exposed, and where the flow of air takes place inside the circular duct. Most ducts have uniform cross-sections with the exit area (usually at the bottom of the duct when the vehicle is hovering) being similar to that of the inlet area (at the top of the duct). Some ducts, however, are slightly divergent, having an exit area that is larger than the inlet area, as this was found to increase efficiency and reduce the power required per unit of lift for a given inlet diameter. Some ducts have a wide inlet lip in order to augment the thrust obtained, especially in hover.

VTOL vehicles are usually more challenging than fixed wing aircraft in terms of stability and control. The main difficulty rises from the fact that, contrary to fixed wing aircraft which accelerate on the ground until enough airspeed is achieved on their flight surfaces, VTOL vehicles hover with sometimes zero forward airspeed. For these vehicles, the control relies on utilizing the rotors or propellers themselves, or the flow of air that they produce to create control forces and moments and forces around the vehicle's center of gravity (CG).

One method, which is very common in helicopters, is to mechanically change, by command from the pilot, the pitch of the rotating rotor blades both collectively and cyclically, and to modify the main thrust as well as moments and/or inclination of the propeller's thrust line that the propeller or rotor exerts on the vehicle. Some VTOL vehicles using ducted or other propellers that are mounted inside the vehicle also employ this method of control. Some designers choose to change only the angle of all the blades using ducted or other propellers that are mounted inside the vehicle for this method of control. The angle of all the blades may be changed simultaneously (termed collective control) to avoid the added complexity of changing the angle of each blade individually (termed cyclic control). On vehicles using multiple fans which are relatively far from the CG, different collective control settings can be used on each fan to produce the desired control moments.

The disadvantage of using collective controls, and especially cyclic controls, lies in their added complexity, weight and cost. Therefore, a simple thrust unit that is also able to generate moments and side forces, while still retaining a simple rotor not needing cyclic blade pitch angle changes, has an advantage over the more complex solution. The main problem is usually the creation of rotational moments of sufficient magnitude required for control.

One traditional way of creating moments on ducted fans is to mount a discrete number of vanes at or slightly below the exit section of the duct. These vanes, which are immersed in the flow exiting the duct, can be deflected to create a side force. Since the vehicle's center of gravity is in most cases at a distance above these vanes, the side force on the vanes also creates a moment around the vehicle's CG.

However, one problem associated with vanes mounted at the exit of the duct in the usual arrangement as described above, is that even if these are able to create some moment in the desired direction, they cannot do so without creating at the same time a significant side force that has an unwanted secondary effect on the vehicle. For such vanes mounted below the vehicle's CG (which is the predominant case in practical VTOL vehicles), these side forces cause the vehicle to accelerate in directions which are usually counter-productive to the result desired through the generation of the moments by the same vanes, thereby limiting their usefulness on such vehicles.

The Chrysler VZ-6 VTOL flying car uses vanes on the exit side of the duct, together with a small number of very large wings mounted outside and above the duct inlet area.

However, in the VZ-6, the single wing and the discrete vanes were used solely for the purpose of creating a steady, constant forward propulsive force, and not for creating varying control moments as part of the stability and control system of the vehicle.

The Hornet unmanned vehicle developed by AD&D, also experimented with using either a single, movable large wing mounted outside and above the inlet, or, alternatively using a small number of vanes close to the inlet side. However these were fixed in angle and could not be moved in flight.

Another case that is sometimes seen is that of vanes installed radially from the center of the duct outwards, for the purpose of creating yawing moments (around the propeller's axis).

OBJECTS AND BRIEF SUMMARY OF THE INVENTION

One object of the present invention is to provide a vehicle with a ducted fan propulsion system which also produces rotary moments and side forces for control purposes. Another object of the invention is to provide a vehicle of the foregoing type particularly useful for VTOL aircraft.

According to a broad aspect of the present invention, there is provided a vehicle, comprising: a vehicle frame; a duct carried by the vehicle frame with the longitudinal axis of the duct perpendicular to the longitudinal axis of the vehicle frame; a propeller rotatably mounted within the duct about the longitudinal axis of the duct to force an ambient fluid therethrough from its inlet at the upper end of the duct through its exit at the lower end of the duct, and thereby to produce an upward lift force applied to the vehicle; and a plurality of spaced vanes pivotally mounted to and across the inlet end of the duct about pivotal axes perpendicular to the longitudinal axis of the duct and selectively pivotal about their axes to produce a desired horizontal control force in addition to the lift force applied to the vehicle.

It has been found that such a vehicle equipped with a plurality of such vanes pivotally mounted across the inlet of the duct (as distinguished from the exit end of the duct) can indeed produce a combination of side forces with rotational moment that is favorable to the normal control of the vehicle. It has also been found that such vanes across the inlet end of the duct, particularly when combined with a second plurality of vanes across the outlet end of the duct, can produce desired forward, aft, left and right translation movements, as well as yaw, pitch and roll rotary movement of the vehicle.

In some described preferred embodiments, the vanes are substantially parallel to the longitudinal axis of the vehicle frame.

Another embodiment is described wherein the vanes include a first group of parallel vanes extending across one half of the inlet of the duct and pivotal about axes at a predetermined acute angle with respect to the longitudinal axis of the vehicle frame; and a second group of parallel vanes extending across the remaining half of the inlet end of the duct and pivotal about axes at the predetermined angle, but in the opposite direction, with respect to the longitudinal axis of the vehicle frame; the first and second groups of vanes being selectively pivotal to produce a desired net control force in addition to the lift force applied to the vehicle.

According to further features in the described preferred embodiments, the vanes have a symmetrical airfoil shape and are spaced from each other a distance approximately equal to the chord length of the vanes.

In one described preferred embodiment, each of the vanes is pivotally mounted as a unit for its complete length to produce a desired side force component. In a second described embodiment, each of the vanes is split into two halves, each half of all the vanes being separately pivotal from the other half of all the vanes, whereby the component force to the lift force applied to the vehicle is a rotary moment force about the duct longitudinal axis.

Other embodiments are described wherein, in one case, each of the vanes is pivotally mounted about an axis passing through the vane, and in another case, each of the vanes includes a fixed section and a pivotal section pivotally mounted at the trailing side of the fixed section.

According to further features in some described preferred embodiments, the duct includes a second plurality of parallel, spaced vanes pivotally mounted to and across the inlet end of the duct about pivotal axes perpendicular to the pivotal axes of the first-mentioned plurality of vanes and perpendicular to the longitudinal axis of the duct.

In one described preferred embodiment, the pivotal axes of the second plurality of vanes are in a plane vertically spaced from the pivotal axes of the first-mentioned plurality of vanes; whereas in a second described embodiment, the pivotal axes of the second plurality of vanes are in a common plane with that of the pivotal axes of the first-mentioned plurality of vanes. With respect to the latter embodiment, it may be desirable to have a slight shift in the two planes in order to offset the pivotal mounting of the vanes, but in such case, the shift would be relatively small, e.g., less than one chord length.

Another embodiment is described wherein the duct includes a second plurality of spaced vanes pivotally mounted to and across the exit end of the duct about pivotal axes perpendicular to the longitudinal axis of the duct and selectively pivotal about their axes to produce another desired side control force or rotary moment control force, in addition to the lift force applied to the vehicle.

Since the foregoing features of the invention are especially useful with respect to VTOL aircraft vehicles, the invention is described below particularly with respect to such vehicles, but it will be appreciated that the invention, or various features thereof, could also be advantageously used in other vehicles, such as sea vehicles.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
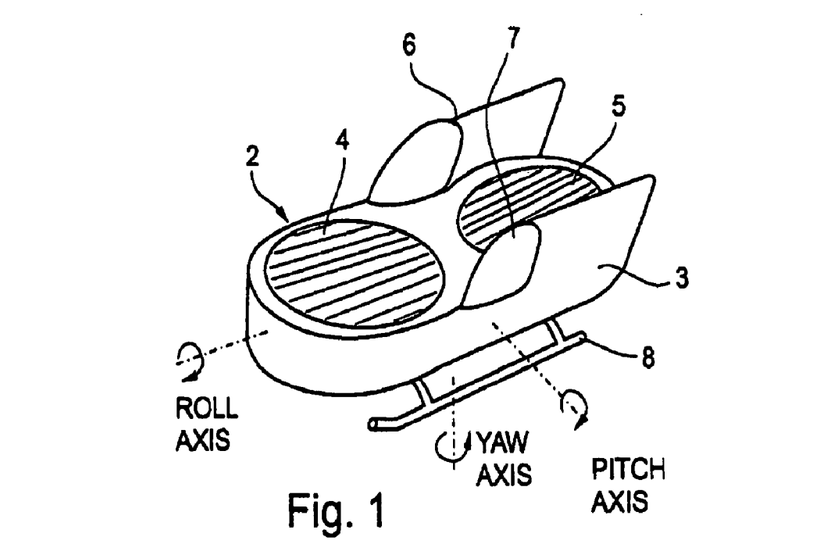
FIG. 1 illustrates one form of VTOL aircraft vehicle constructed in accordance with present invention.

The vehicle illustrated in FIG. 1, and therein generally designated 2, is a VTOL aircraft including a frame or fuselage 3 carrying a ducted fan propulsion unit 4 at the front, and another similar propulsion unit 5 at the rear. The vehicle payload is shown at 6 and 7, respectively, on opposite sides of the fuselage, and the landing gear as shown at 8.

Figure 2:
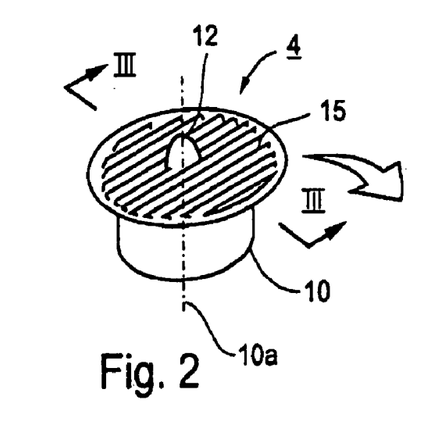
FIG. 2 illustrates only one of the ducted fans in the aircraft of FIG. 1.
Figure 3:
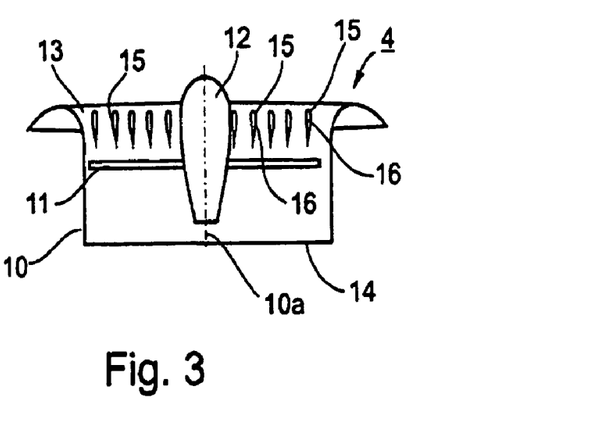
FIG. 3 is a sectional view along line III-III of FIG. 2.

FIGS. 2 and 3 more particularly illustrate the structure of propulsion unit 4, which is the same as propulsion unit 5. Such a propulsion unit includes a duct 10 carried by the fuselage 3 with the vertical axis 10a of the duct parallel to the vertical axis of the vehicle. Propeller 11 is rotatably mounted within the duct 10 about the longitudinal axis 10a of the duct. Nose 12 of the propeller faces upwardly, so that the upper end 13 of the duct constitutes the air inlet end, and the lower end 14 of the duct constitutes the exit end. As shown particularly in FIG. 3, the upper air inlet end 13 is formed with a funnel-shaped mouth to produce a smooth inflow of air into the duct 10, which air is discharged at high velocity through the exit end 14 of the duct for creating an upward lift force.

Figure 4:
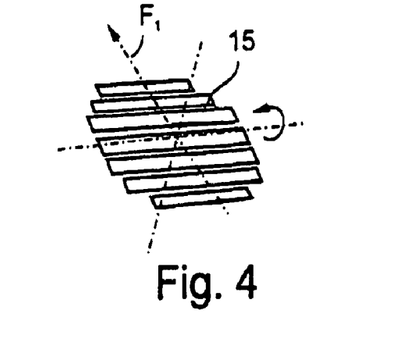
FIG. 4 is a diagram illustrating the positioning of the vanes of FIG. 3 in one direction to produce a lateral force in one direction.
Figure 5:
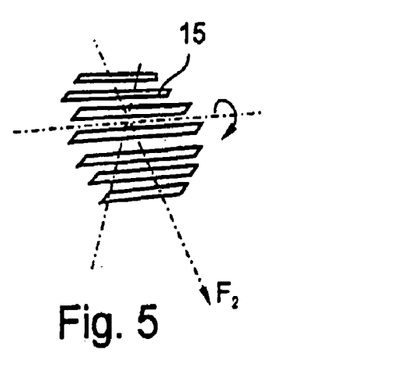
FIG. 5 is a diagram illustrating the positioning of the vanes of FIG. 3 to produce a lateral force in the opposite direction.

To provide directional control, the duct 10 is provided with a plurality of parallel, spaced vanes 15 pivotally mounted to, and across, the inlet end 13 of the duct. Each of the vanes 15 is pivotal about an axis 16 perpendicular to the longitudinal axis 10a of the duct 10 and substantially parallel to the longitudinal axis of the vehicle frame 2, to produce a desired horizontal control force in addition to the lift force applied to the vehicle by the movement of air produced by the propeller 11. Thus, as shown in FIG. 4, if the vanes 15 are pivoted in one direction about their respective axes, they produce a desired control force in the direction of the arrow F1 in FIG. 4; and if they are pivoted in the opposite direction, they produce a desired control force in the direction of the arrow F2 in FIG. 5. As shown in FIG. 3 (also FIGS. 7, 8, 12), the vanes 15 are of a symmetric airfoil shape and are spaced from each other a distance approximately equal to the chord length of the vanes.

Figure 6:
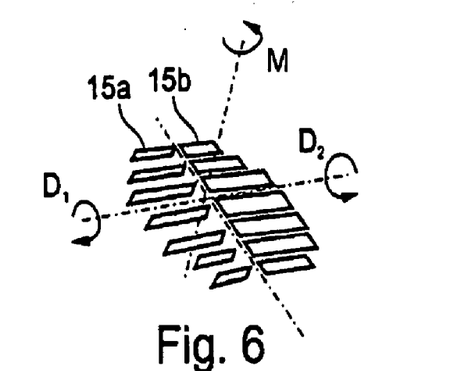
FIG. 6 illustrates a modification in the construction of the vanes wherein each of the vanes is split into two halves, each half of all the vanes being separately pivotal from the other half of all the vanes to produce a rotary moment force about the duct longitudinal axis.

FIG. 6 illustrates a variation wherein each of the vanes 15, instead of being pivotally mounted as a unit for its complete length to produce the desired side control force is split into two half-sections, as shown at 15a and 15b in FIG. 6, with each half-section separately pivotal from the other half-section. Thus, all the half-sections 15a may be pivoted as a unit in one direction as shown by arrow $D_1$, and all the half-sections 15b may be pivoted in the opposite direction as shown by arrow $D_2$, to thereby produce any desired side force or rotary moment in addition to the lift force applied to the vehicle by the propeller.

Figure 7:
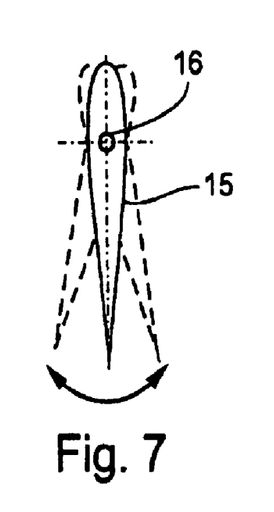
FIG. 7 is a diagram illustrating the construction of one of the vanes and the manner for pivoting it.
Figure 8:
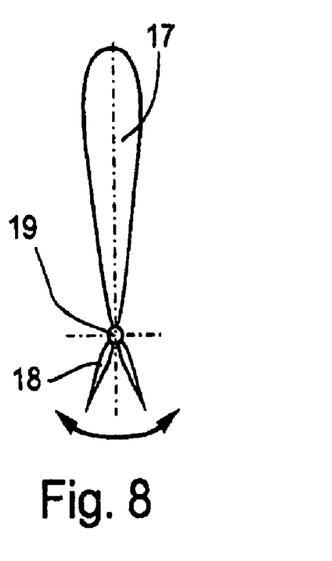
FIG. 8 illustrates an alternative construction of one of the vanes and the manner for pivoting it.

As shown in FIG. 7, each of the vanes 15 is pivotally mounted about axis 16 passing through a mid portion of the vane. FIG. 8 illustrates a modification wherein each vane includes a fixed section 17, which constitutes the main part of the vane, and a pivotal section or flap 18 pivotally mounted at 19 to the trailing side of the fixed section. It will thus be seen that the pivotal section or flap 18 may be pivoted to any desired position in order to produce the desired control force in addition to the lift.

Figure 9:
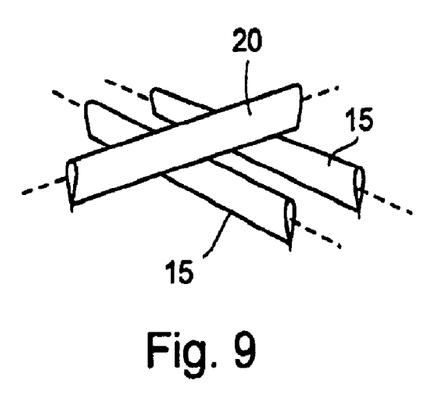
FIG. 9 illustrates one arrangement that may be used for providing two cascades or assemblies of vanes at the inlet end of the duct of FIG. 9.

FIG. 9 illustrates a variation wherein the ducted fan (4 and/or 5 FIG. 1) includes a second plurality or cascade of parallel, spaced vanes, one of which is shown at 20, pivotally mounted to and across the inlet end 13 of the duct 10. Thus, each of the vanes 20 of the second plurality is closely spaced to the vanes 15 and is pivotal about an axis perpendicular to the pivotal axis of the vanes 15, as well as to the longitudinal axis 10a of the duct.

Figure 10:
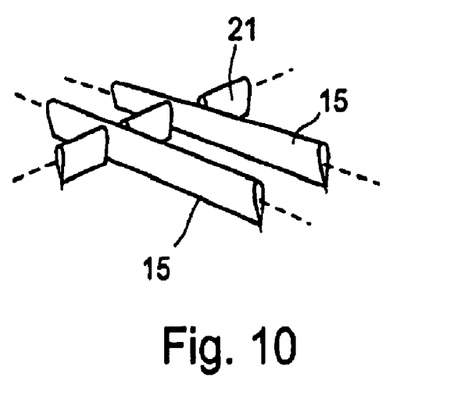
FIG. 10 illustrates another arrangement that may be used for providing two cascades or assemblies of vanes at the inlet end of the duct.

In the variation illustrated in FIG. 9, the two cascades of vanes 15, 20, are arranged in parallel, spaced planes. FIG. 10 illustrates a variation wherein the two cascades of vanes at the inlet end of the duct are intermeshed. For this purpose, each of the vanes 21 of the second plurality would be interrupted so as to accommodate the crossing vanes 15 of the first plurality, as shown in FIG. 10. Another possible arrangement would be to have the vanes of both cascades interrupted for purposes of intermeshing.

Figure 11:
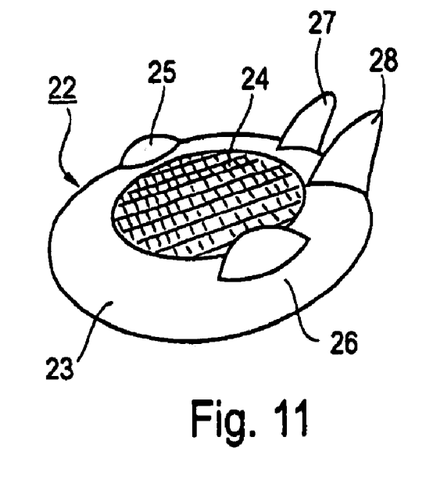
FIG. 11 illustrates a VTOL aircraft vehicle including a single ducted fan for propulsion and control purposes.

FIG. 11 illustrates a VTOL aircraft vehicle, therein generally designated 22, including a single ducted fan 24 carried centrally of its fuselage 23. Such a vehicle could include the arrangement of vanes illustrated in either FIG. 9 or in FIG. 10 to provide the desired control forces and moments in addition to the lift forces. In such a vehicle, the payload may be on opposite sides of the central ducted fan 24, as shown at 25 and 26 in FIG. 11. The vehicle may also include other aerodynamic surfaces, such as rudders 27, 28 to provide steering and other controls.

Figure 12:
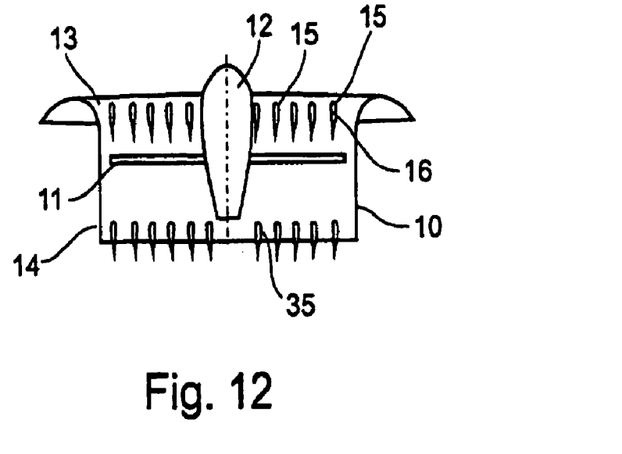
FIG. 12 is a view similar to that of FIG. 3 but illustrating the provision of a cascade or plurality of vanes also at the exit end of the duct.

FIG. 12 illustrates a further embodiment that may be included in either of the vehicles of FIGS. 1 and 11 wherein the duct 10 also has a second plurality or cascade of parallel, spaced vanes, but in this case, the second plurality are pivotally mounted to and across the exit end 14 of the duct 10. Thus, as shown in FIG. 12, the duct 10 includes the first plurality or cascade of blades 15 mounted to and across the inlet end 13 of the duct, and a second plurality or cascade of blades 35 mounted to and across the exit end 14 of the duct 10, also perpendicular to the longitudinal axis of the duct and substantially parallel to the longitudinal axis of the vehicle frame. Each assembly or cascade 15, 35 of the vanes may be pivoted independently of the other to produce selected side forces or rotary moments about the duct's transverse axis 10b for pitch or roll control of the vehicle.

Figure 13A:
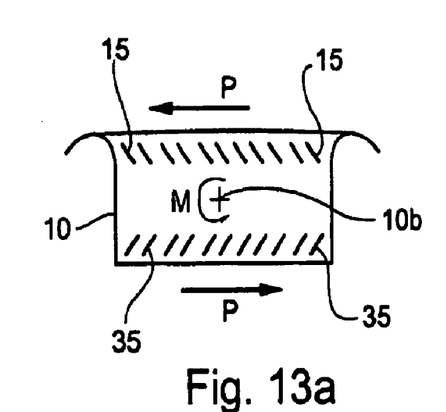
FIGS. 13a-13d illustrate various pivotal positions of the two cascades of vanes in the ducted fan of FIG. 12, and the forces produced by each such positioning of the vanes.
Figure 13B:
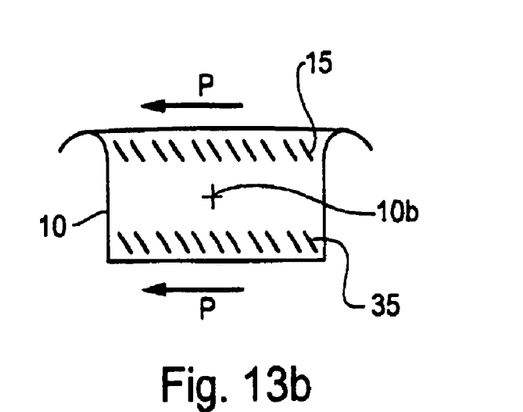
Figure 13C:
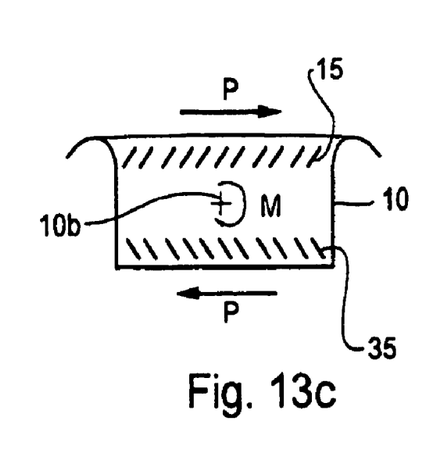
Figure 13D:
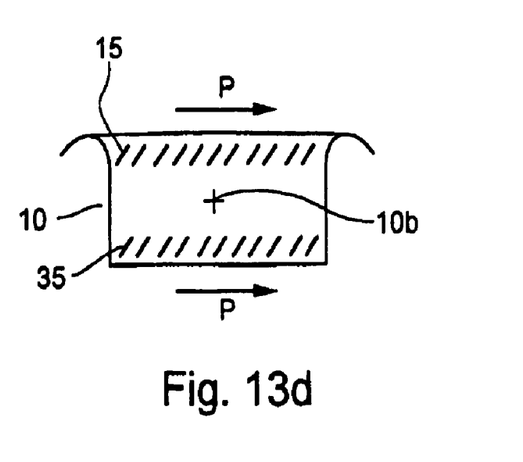

This is more clearly shown in the diagrams of FIGS. 13a-13d. Thus, when the two cascades of vanes 15, 35, are pivoted in opposite directions, they produce a rotary moment about the transverse axis 10b of the duct 10 in one direction (e.g., counterclockwise as shown in FIG. 13a); when they are pivoted in the same direction, they produce a side force in one direction (e.g. left) as shown in FIG. 13b when pivoted in opposite directions but opposite to the arrangement shown in FIG. 13a, they produce a rotary moment in the opposite clockwise direction as shown in FIG. 13c; and when they are pivoted in the same direction but opposite to. that shown in FIG. 13b, they produce a side force in the opposite (e.g. right) direction, as shown in FIG. 13d.

Figure 14:
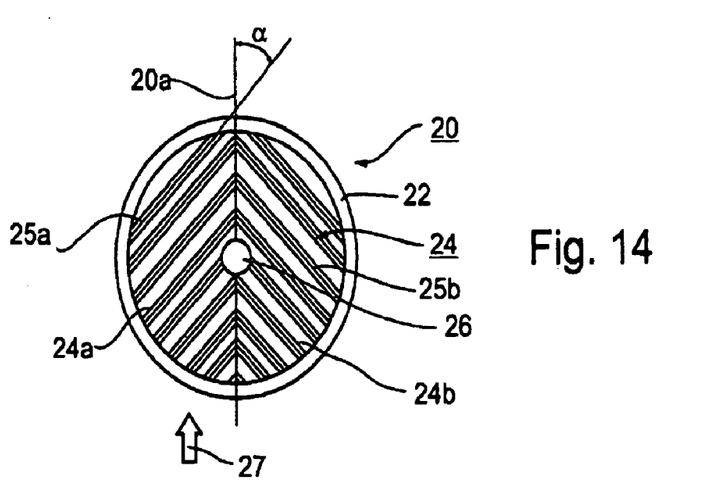
FIG. 14 is a top view diagrammatically illustrating another construction wherein the vanes extending across the inlet of the duct are divided into two groups together producing the desired net horizontal control force.

FIG. 14 is a top view illustrating another construction of ducted fan propulsion unit, generally designated 20, including a duct 22 having a plurality of vanes 24 extending across the inlet end of the duct. In this case, the vanes 24 are divided into a first group of parallel vanes 24a extending across one-half the inlet end of the duct 22, and a second group of parallel vanes 24b extending across the remaining half of the inlet end of the duct.

FIG. 14 also illustrates the nose 26 of the propeller within the duct 22. The propeller is rotatably mounted within the duct 22 about the longitudinal axis of the duct, with the nose 26 of the propeller centrally located at the air inlet end of the duct such that the air discharged at a high velocity through the opposite end of the duct creates an upward lift force.

As shown in FIG. 14, the first group of parallel vanes 24a extending across one half of the inlet end of the duct 22 are pivotal about axes 25a at a predetermined acute angle α with respect to the longitudinal axis 20a of the vehicle frame and thereby of the direction of movement of the vehicle as shown by arrow 27; and that the second group of parallel vanes extending across the remaining half of the inlet end of the duct are pivotal about axes 25b at the same predetermined angle α, but in the opposite direction, with respect to the longitudinal axis 20a of the vehicle frame. The two groups of vanes 24a, 24b are selectively pivotal to produce a desired net horizontal control force in addition to the lift force applied to the vehicle.

Figure 15A:
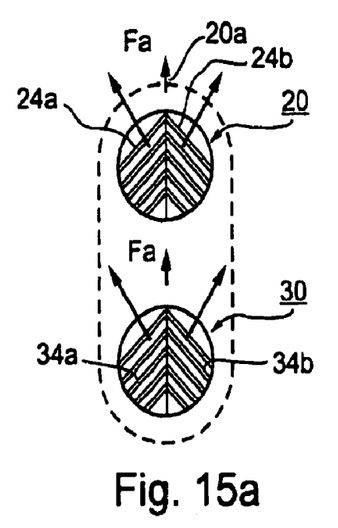
FIGS. 15a and 15b diagrammatically illustrate the manner in which the desired net horizontal control force is produced by the vanes of FIG. 14.
Figure 15B:
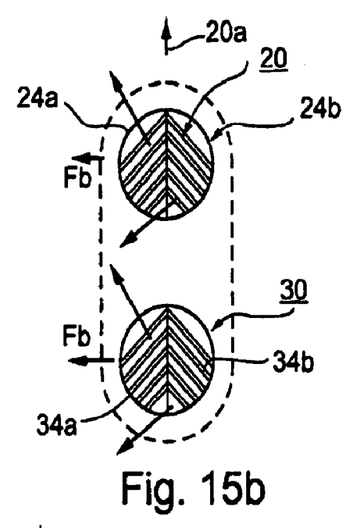

The foregoing operations are illustrated in the diagrams of FIGS. 15a and 15b. Both FIG. 15a and 15b illustrate the control forces generated when the vehicle includes two ducted fan propulsion units 20, 30, at the opposite ends of the vehicle and coaxial with the vehicle longitudinal axis 20L It will be appreciated that comparable forces are produced when the vehicle is equipped with only one ducted fan propulsion unit shown in FIG. 14.

FIG. 15a illustrates the condition wherein the two groups of vanes 24a, 24b are pivoted to equal angles about their respective axes. The vanes thus produce, in addition to the lift force, control forces of equal magnitude and angles on opposite sides of the vehicle longitudinal axis 20a, so as to produce a net force, shown at Fa, coaxial with the vehicle longitudinal axis 20a.

The two groups of vanes 34a, 34b of the rear propulsion unit 30 are pivotal in the same manner about their respective pivotal axes and thereby produce a net force Fa also coaxial with the vehicle longitudinal axis 20a.

FIG. 15b illustrates a condition wherein the two groups of vanes 24a, 24b in the fore propulsion unit 20, and the two groups of vanes 34a, 34b in the aft propulsion unit 30, are pivoted about their respective axes to unequal angles, thereby producing net side forces Fb at an angle to the vehicle longitudinal axis 20a Thus, by controlling the pivot angles of the vanes 24a, 24b and 34a, 34b about their respective pivotal axes, a net control force may be generated as desired in the plane of the vanes.

Figure 16:
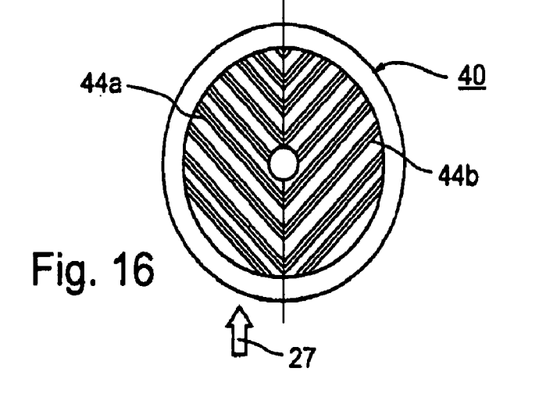
FIG. 16 is a view corresponding to that of FIG. 14 but illustrating a variation in the vane arrangement for producing the desired net horizontal control force.

FIG. 16 illustrates a ducted fan propulsion unit, generally designated 40, also including two groups of vanes 44a, 44b, extending across one-half of the inlet of the duct 42 and pivotally mounted about axes 45a, 45b at a predetermined angle, (e.g., 45°) to the longitudinal axis 40a of the vehicle. In this case, however, the vanes 44a, 44b are oriented in the forward direction, rather than in the aft direction as in FIG. 14, but the operation, and the forces generated by the vanes, are basically the same as described above with respect to FIGS. 14, 15a, 15b.

It will be appreciated that any of the foregoing arrangements of FIGS. 14-16, as well as those of FIGS. 1-11, could also be provided at the exit ends of the ducts, as shown in FIGS. 12-13d, to produce the desired control forces in addition to the lift forces. The vanes are not intended to block air flow, but merely to deflect air flow to produce the desired control forces. Accordingly, in most applications the vanes would be designed to be pivotal no more than 15° in either direction, which is the typical maximum angle attainable before flow separation.

Since the control forces and moments are generated by horizontal components of the lift forces on the vanes themselves, the vanes should preferably be placed on the intake side of the propeller as far from the center of gravity of the vehicle as possible for creating the largest attainable moments. The same applies if vanes are provided on the exit side of the ducts.

While the invention has been described above particularly with respect to air vehicles, it will be appreciated that the invention, or various aspects of the invention as described above, can also be advantageously used with other types of vehicles such as sea vehicles, to provide propulsion and directional control to the vehicle.

Accordingly, while the invention has been described with respect to several preferred embodiments, it will be understood that these are set forth merely for purposes of example, and that many other variations, modifications and applications of the invention may be made.

What is claimed is:

1. A vehicle, comprising:
a vehicle frame;
a first duct carried by said vehicle frame at a forward end of said vehicle frame and a second duct carried by said vehicle frame at an aft end of said vehicle frame, with longitudinal axes of said first and second ducts arranged substantially perpendicular to a longitudinal axis of the vehicle frame;
a propeller rotatably mounted within each of said first and second ducts, each propeller arranged to force an ambient fluid through its respective duct from an inlet at an upper end of the duct through an exit at a lower end of the duct, to thereby produce an upward lift force applied to the vehicle; and
a plurality of parallel, pivotably mounted vanes extending across the inlet of each duct for rotation about respective axes substantially perpendicular to said longitudinal axes of the ducts and substantially parallel to said longitudinal axis of the vehicle frame, said vanes being selectively pivotable about said respective axes to produce a desired horizontal force component to the lift force applied to the vehicle.

2. The vehicle according to claim 1 wherein said vanes have a symmetrical airfoil shape.

3. The vehicle according to claim 1 wherein each of said vanes is split into two halves, each half of all the vanes being separately pivotable from the other half of all the vanes, whereby the force component to the lift force applied to the vehicle is a rotary moment force about the duct longitudinal axis.

4. The vehicle according to claim 1, wherein each of said vanes includes a fixed section and a pivotable section mounted at the trailing side of the fixed section.

5. The vehicle according to claim 1, wherein each of said first and second ducts includes a second plurality of parallel pivotably mounted vanes extending across said inlet of the duct and pivotable about second axes perpendicular to said respective axes of the first-mentioned plurality of vanes and perpendicular to said longitudinal axis of the duct.

6. The vehicle according to claim 5 wherein the second axes of said second plurality of vanes are in a plane vertically spaced from the axes of said first-mentioned plurality of vanes.

7. The vehicle according to claim 5 wherein the second axes of said second vanes are in a common plane with that of the pivotal axes of said first-mentioned plurality of vanes.

8. The vehicle according to claim 1 wherein each said duct includes a second plurality of parallel pivotably mounted vanes extending across said exit of the duct about axes perpendicular to said longitudinal axis of the duct and substantially parallel to said longitudinal axis of the vehicle frame to thereby produce a desired side force component, or a rotary moment force component about the duct transverse axis, to the lift force applied to the vehicle.

9. The vehicle according to claim 8 wherein said first and second plurality of vanes are respectively pivotable in opposite directions to thereby produce a rotary moment about a transverse axis of said duct.

10. The vehicle according to claim 8 wherein said first and second plurality of vanes are respectively pivotable in the same direction to thereby produce a side force on the vehicle.

* * * * *